United States Patent [19]

Hein

[11] Patent Number: 5,165,822
[45] Date of Patent: Nov. 24, 1992

[54] PIPE JOINT FOR DRIVING PIPES LAID UNDERGROUND BY THE DRIVING TECHNIQUE

[75] Inventor: Hans-Georg Hein, Brebach-Fichingen, Fed. Rep. of Germany

[73] Assignee: Halbergerhutte GmbH, Saarbrucken-Brebach, Fed. Rep. of Germany

[21] Appl. No.: 659,361

[22] PCT Filed: Jul. 10, 1990

[86] PCT No.: PCT/EP90/01124
§ 371 Date: Apr. 11, 1991
§ 102(e) Date: Apr. 11, 1991

[87] PCT Pub. No.: WO91/00974
PCT Pub. Date: Jan. 24, 1991

[30] Foreign Application Priority Data

Jul. 12, 1989 [DE] Fed. Rep. of Germany ....... 3922985

[51] Int. Cl.⁵ .............................................. F16L 1/00
[52] U.S. Cl. ..................................... 405/184; 405/154
[58] Field of Search ........ 405/184, 154, 252, 133-136, 405/250; 254/29 R; 285/230, 288; 138/175, 176, 140, 141

[56] References Cited

U.S. PATENT DOCUMENTS

| 4,552,485 | 11/1985 | Hammer | 405/184 |
| 4,801,222 | 1/1989 | Froblick | 405/184 |
| 4,808,032 | 2/1989 | John | 405/184 |
| 4,966,494 | 10/1990 | Inagaski et al. | 405/184 |

FOREIGN PATENT DOCUMENTS

| 806494 | 2/1974 | Belgium . |
| 3618334 | 7/1987 | Fed. Rep. of Germany . |
| 3703580 | 8/1988 | Fed. Rep. of Germany . |
| 3841064 | 6/1989 | Fed. Rep. of Germany . |

Primary Examiner—Dennis L. Taylor
Attorney, Agent, or Firm—Price, Heneveld, Cooper, DeWitt & Litton

[57] ABSTRACT

A pipe joint is described for driving pipes laid underground by the driving technique and having an inner pipe made of cast iron to which the force of pressure is applied during driving, wherein each driving pipe is constructed from the inner cast iron pipe formed without a socket and a coaxially disposed outer casing forming a lost casing for an intermediate layer of cement-containing material between the inner and outer pipes. The pipe joint has at least one seal ring disposed on a protruding portion of the inner cast iron pipe.

17 Claims, 3 Drawing Sheets

PIPE JOINT FOR DRIVING PIPES LAID UNDERGROUND BY THE DRIVING TECHNIQUE

The present invention relates to a pipe joint for driving pipes laid underground.

It has recently become more and more customary to lay sewage pipes and the like underground using the so-called "driving technique." The driving technique involves driving the pipes from a central shaft or pit in the desired direction up to another shaft, whereby the current laying distance of the pipes is about 75 to 100 m, but will increase further. This driving technique can be used expediently in particular to lay pipes with nominal diameters of 250 to 1000 mm. The advantage of this driving technique is that it is no longer necessary to dig shafts over the entire laying length when laying sewage pipes underground. One can thus not only dispense with troublesome digging work but also keep the necessary blockage of streets to a minimum.

However, the lengths of the pipes laid underground by the driving technique are limited by the diameter of the central shaft. With a shaft diameter of 2 m one can drive pipes out of the shaft that have a length of about 1 m. With a shaft diameter of 3 m it is possible to drive pipes having a length of 2 m. That is, the driving technique limits the length of the pipes to be laid so that a great number of pipe joints are required for joining the pipes into a conduit.

For pipes laid underground by the driving technique, however, the pipe joints are of particular importance since the pipe joints should not protrude beyond the pipe either outwardly or inwardly. They should not protrude inwardly because sewage pipes are regularly laid on a small slope and the projections within the pipe would constitute barriers for the sewerage. Projections of the pipe joint outwardly interfere with the rough-pressing of the pipes, since frictional forces of 1 to 4 $p/m^2$ must be taken up. The forces that build up due to outer projections from pipe joints would be so great that there would be a danger of the outward projections shearing off. Furthermore, outwardly projecting ribs cause earth material to be carried along during driving of the pipes, so that earth masses may cave in when the pipes are laid underground. The forces can be reduced by employing lubricants but, firstly, this involves a surplus effort and, secondly, the resulting reduction of forces is insufficient in particular in view of the long laying distance of 100 m and more.

For the driving technique one very often uses concrete pipes with a length of 1 m, in particular asbestos cement pipes. Compared to cast iron pipes these concrete pipes are ten times as thick, so that pipe joints can readily be accommodated within them without any projections outwardly or inwardly. Such thick concrete pipes permit good axial force transmission, but the large outside diameters of the pipes mean that a very great amount of material must be moved aside when the pipes are driven. The thickness of the pipes also causes a very high buildup of forces in the case of large laying distances.

One has therefore begun to use cast iron pipes that are encased with concrete pipes (German patent no. 36 18 334). The cast iron pipes serve here to transmit the forces of pressure. The cast iron pipes are connected by conventional socket joints, the cast iron pipes being formed at one end with a bell to produce a socket and at the other end as an inserting end for the socket. However, the encasing of the cast iron pipes is elaborate to produce because a steel mat is laid about the cast iron pipe and concrete is cast thereabove and then jolted on. An expensive and elaborate method is therefore required to hide the projections of the pipe joint on the outside. A further disadvantage is that cast iron pipes must be produced with a small length of 1 m and different end formations, namely a socket and an inserting end. In practice, however, one attempts to produce cast iron pipes with a great length of 6 to 7 m for reasons of production technology. It would be less expensive here to cut these pipes to lengths of 1 m and to employ such shortened pipes for laying by the driving technique. But such pipes would lack a socket and corresponding inserting end.

The invention is based on the problem of providing a pipe joint that is not built up either outwardly or inwardly and can nevertheless be accommodated when the driving pipes have a minimal thickness, special end formations of the cast iron pipes being avoided if possible.

This problem is solved inventively by the features in the characterizing part of claim 1, while expedient developments of the invention are characterized by the features in the subclaims.

According to the invention, inner cast iron pipes are used for the force of pressure that are preferably made of ductile cast iron and are completely free from sockets, i.e. have the same design at each end. This makes it possible to employ pieces of pipe that are cut off from long pipes. By suitably designing the driving pipes with an intermediate layer and an outer casing serving as a lost casing for the intermediate layer, one creates space between the abutting ends of the driving pipes to be joined for accommodating suitable coupling members. One specifically uses at least one seal ring disposed or mounted on an end portion protruding beyond the intermediate layer on the cast iron pipe (s) of the two driving pipes. The seal rings used here may be conventional seal rings for pipe socket joints, so that the thickness of the filling intermediate cement layer is limited by the height of these seal rings. The outer casing serves as a lost casing for the layer of mortar and contributes to making the outer surface smooth. This considerably reduces the frictional forces occurring during driving of the pipes.

The outer casing can be made of plastics or asbestos cement, but it is preferable to employ a so-called folded spiral-seam pipe, i.e. a pipe wound out of a metal strip but with the overlapping seams pointing inside. Folded spiral-seam pipes are characterized by being easy to produce and inexpensive. The outside is relatively smooth so that frictional forces are reduced. The inwardly protruding overlapping seams serve to anchor the intermediate mortar layer and at the same time to reinforce the intermediate layer. The intermediate layer is suitably made of cement mortar-like material, i.e. cement mortar or a similar material which can be provided as mortar in the space between the casing and the cast iron pipe. Thus, one can also use swelling concrete and the like instead of cement mortar. However, mortar is suitable in particular due to its low cost. What is essential is that the material be nonshrinking.

In a further embodiment of the invention a distance ring is provided that must withstand the internal pressure. This distance ring constitutes a part of the pipe joint and can be made of steel, cast iron, plastics, asbestos cement or another suitable material. Particularly suitable materials, however, are steel or sheet metal.

In a particularly expedient development of the invention, a ring is float mounted in the area of the gap at the joint between the two inner cast iron pipes, said ring having an radially inward protruding tongue that engages the joint between the faces of the abutting cast iron pipes. It is preferable to use a ring with a T-shaped cross section, whereby the material of the ring should be softer than the material of the cast iron. A suitable material is in particular soft iron, but also aluminum or copper. This float mounted ring is very essential for perfect load transmission, since driving over long distances may involve bends that can be taken up by an upsetting of the T-ring. If necessary the ductile cast iron will take up the bends by upsetting or deformation if the bends cannot be compensated by the T-ring.

It is particularly expedient to use two seal rings, each seal ring being associated to one of the driving pipes and seated on the axially projecting end portion of the inner cast iron pipe. By using the cast iron pipes and two seal rings per pipe joint one ensures a perfectly sealed joint.

It is advantageous if the driving pipes have a ready-to-lay design, including the inner cast iron pipe, the outer casing and the intermediate layer between the casing and the cast iron pipe. In an advantageous development of the invention, the distance ring and possibly one of the seal rings are integrated into the ready-to-lay unit of the driving pipe, so that when assembling the pipes one need only mount the T-ring and possibly a further seal ring at the end of the other driving pipe.

The invention is characterized by a very compact construction of the driving pipes, the thicknesses being smaller by a factor of ten than those of conventional cement and concrete pipes, so that substantially less material must be displaced during driving of the pipes although the nominal diameter is the same. The buildup of forces during driving is thus also substantially smaller. This means that smaller forces occur during driving of the pipes than with conventional cement pipes, permitting much gentler laying. Since the inner cast iron pipes are the same at both ends, in particular have no bell to produce a socket, they can be cut directly from long pipes without any additional treatment of the pipes. This considerably reduces the price of such driving pipes. The material of the intermediate layer also acts secondarily as corrosion proofing for the cast iron pipe. Due to the folded spiral-seam pipe it is unnecessary to reinforce the intermediate concrete layer. At the same time, the folded spiral-seam pipe with its inwardly protruding overlapping seams ensures a very smooth outer surface, which reduces the frictional forces during driving of the pipes.

In the following, exemplary embodiments of the invention shall be described with reference to the [drawing, in which FIGS. 1 to 4 show various exemplary embodiments of the pipe joint in cross section and a schematic view] drawings, briefly described as follows.

Figure 1:
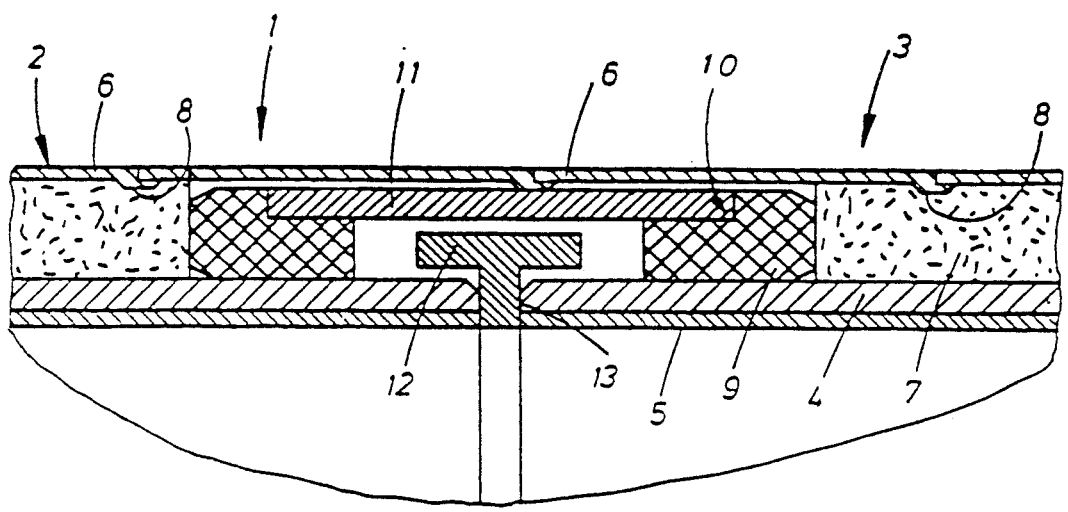
FIG. 1 is a fragmentary, longitudinal sectional view of a first embodiment of a pipe joint according to the present invention.

Driving pipes 2 and 3 interconnected by pipe joint 1 each have an inner pipe 4 made of ductile cast iron which can be coated with cement on the inside at 5. Inner cast iron pipe 4 is surrounded at a radial distance by a coaxially disposed outer casing 6. The space between inner cast iron pipe 4 and outer casing 6 is filled with an intermediate layer 7. A suitable material for intermediate layer 7 is in particular cement mortar, but other similar materials may also be used, such as swelling concrete and the like, provided they are nonshrinking. Cement mortar is suitable in particular due to its low cost.

The casing can be made of asbestos cement or plastics, but in the shown embodiment example it is formed in particular as a folded spiral-seam pipe, i.e. made of a metal strip wound into a pipe. Projections 8 arising at the points of overlap during production of the folded spiral-seam pipe are directed inwardly, however, creating a smooth outer surface of the casing. Inwardly projecting ribs 8 serve as reinforcing ribs for intermediate layer 7 made of concrete mortar.

The two inner cast iron pipes 4 protrude axially at the ends beyond intermediate layer 7 so that seal rings 9 can be mounted, that lie with their faces against intermediate layer 7. One can use commercial seal rings that are provided in particular at the top at 10 with a recess for taking up a distance ring 11. A suitable material for the seal rings is caoutchouc or rubber. The seal rings can be made in particular of Tyton. Distance ring 11 can be made of cast iron, plastics, asbestos cement, but is in particular made of steel or sheet metal.

In the area of the gap at the joint between aligned cast iron pipes 4, a ring 12 is float mounted, that has a T-shape design in the shown embodiment example. Stem 13 of ring 12 extends into the area of the gap at the joint, whereby the two pipes 4 lie against the faces of stem 13. The two legs of ring 12 overlap the two end portions of cast iron pipes 4. Ring 12 is made of a material which is softer than the material of the cast iron pipes, whereby in particular soft iron but also aluminum or copper are used. T-ring 12 must be in a position to take up deformations so that any bends occurring during driving over long distances can be taken up or compensated by upsetting of the T-ring. If necessary the ductile cast iron takes up these bends by upsetting or deformation.

As indicated by FIG. 1, outer casing 6 is flush with the face of intermediate layer 7 in driving pipe 2 shown on the left in FIG. 1, whereas casing 6 at the left end of driving pipe 3 shown on the right extends axially beyond intermediate layer 7 and also beyond the projecting end portion of inner cast iron pipes 4, so that a receiving chamber for seal rings 8 and 9 as well as distance ring 5 and T-shaped ring 12 is formed between the protruding end of outer casing 6 and the protruding end portions of the two pipes 4. The thickness of driving pipes 2 and 3 is evidently reduced to the thickness of the cast iron pipes plus the height of conventional seal rings 9 including the thickness of outer casing 6, whereby the outer casing may have accordingly thin walls because it must only fulfill the function of a lost casing for intermediate layer 7. This means that driving pipes 2 and 3 constructed as in FIG. 1 are characterized by a very thin-walled structure.

Driving pipes 2 and 3 are assembled in the factory as ready-to-lay units, comprising inner pipe 4, outer casing 6 as a lost casing and intermediate layer 7 made in particular of cement mortar. On the spot one need only insert the T-shaped ring, the seal rings and the distance ring.

Figure 2:
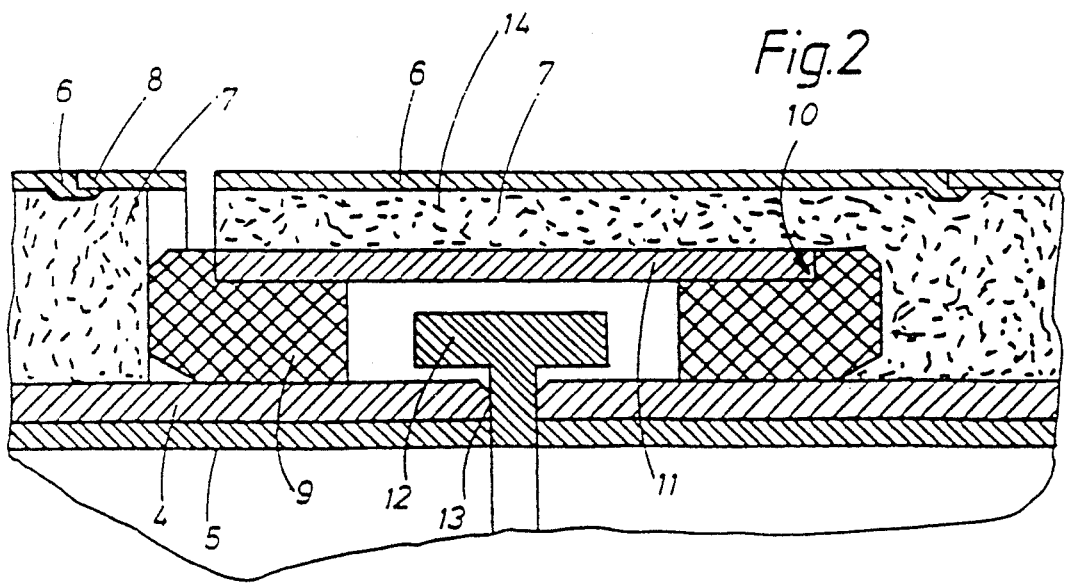
FIG. 2 is a fragmentary, longitudinal sectional view of a second embodiment of the invention.

The embodiment of FIG. 2 corresponds largely to the embodiment of FIG. 1 so that the same reference numbers have been used for the same components. The difference is that driving pipe 3 shown on the right in FIG. 2 is produced as a ready-to-lay unit including seal ring 9 and distance ring 11. This simplifies the assembly since on the spot one need only mount further seal ring 8 and float mounted T-shaped ring 12. Finally, in this embodiment the material of the intermediate layer is also drawn over distance ring 11 at 14 due to the embedding of distance ring 11 in the ready-to-lay unit.

Figure 3:
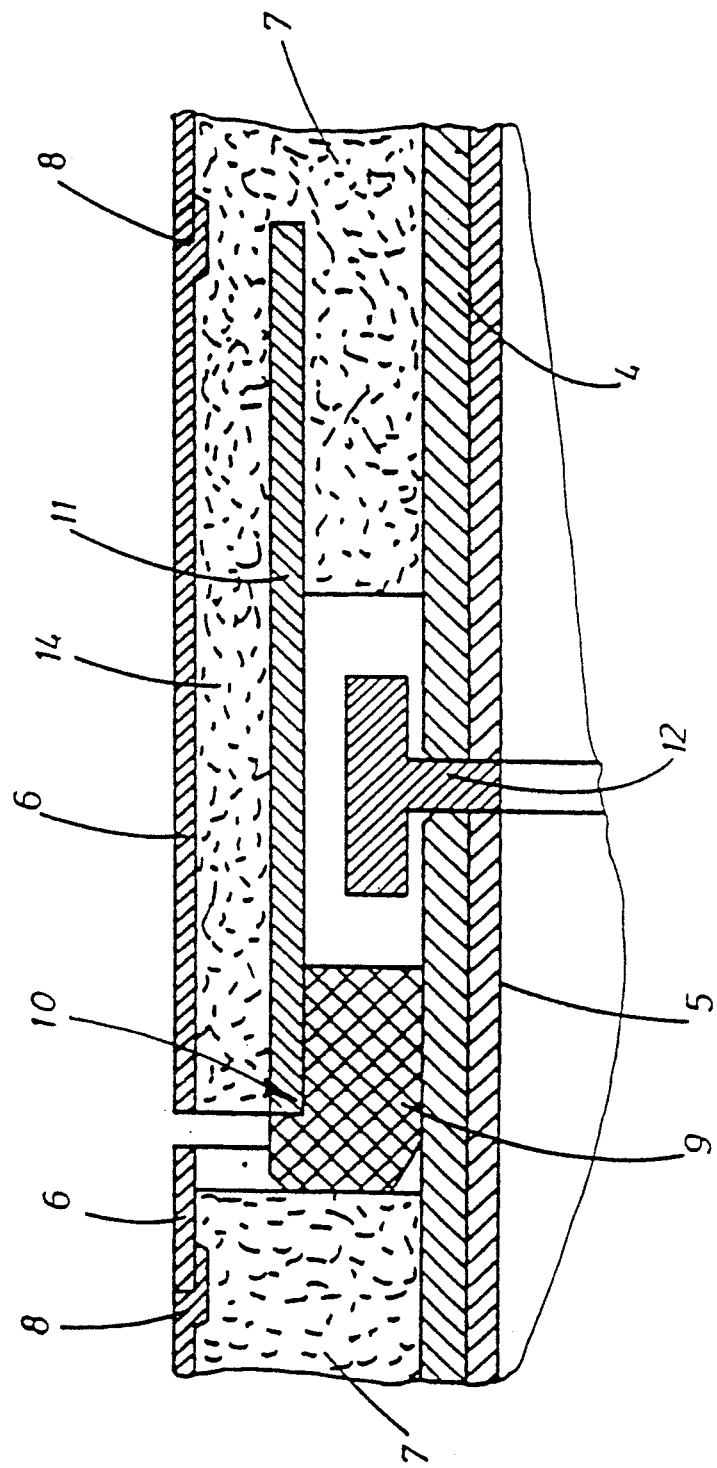
FIG. 3 is a fragmentary, longitudinal sectional view of a third embodiment of the invention.

The embodiment of FIG. 3 differs from the preceding embodiments in that only one seal ring, namely seal ring 8, is used on driving pipe 2 shown on the left. Distance ring 11 made of sheet metal is embedded at 15 in the material of intermediate layer 7, so that the driving pipes of FIG. 3 are designed as ready-to-lay units comprising inner cast iron pipe 4, outer casing 6, intermediate layer 7 and at one end integrated distance ring 11. On the spot one need only incorporate or mount seal ring 8 and T-shaped ring 12. Due to the omission of one the two seal rings, however, this embodiment does not have the advantage of the joint being absolutely watertight, since in this embodiment the water pressure is directly against the concrete of intermediate layer 7 due to the lack of the one seal ring.

Figure 4:
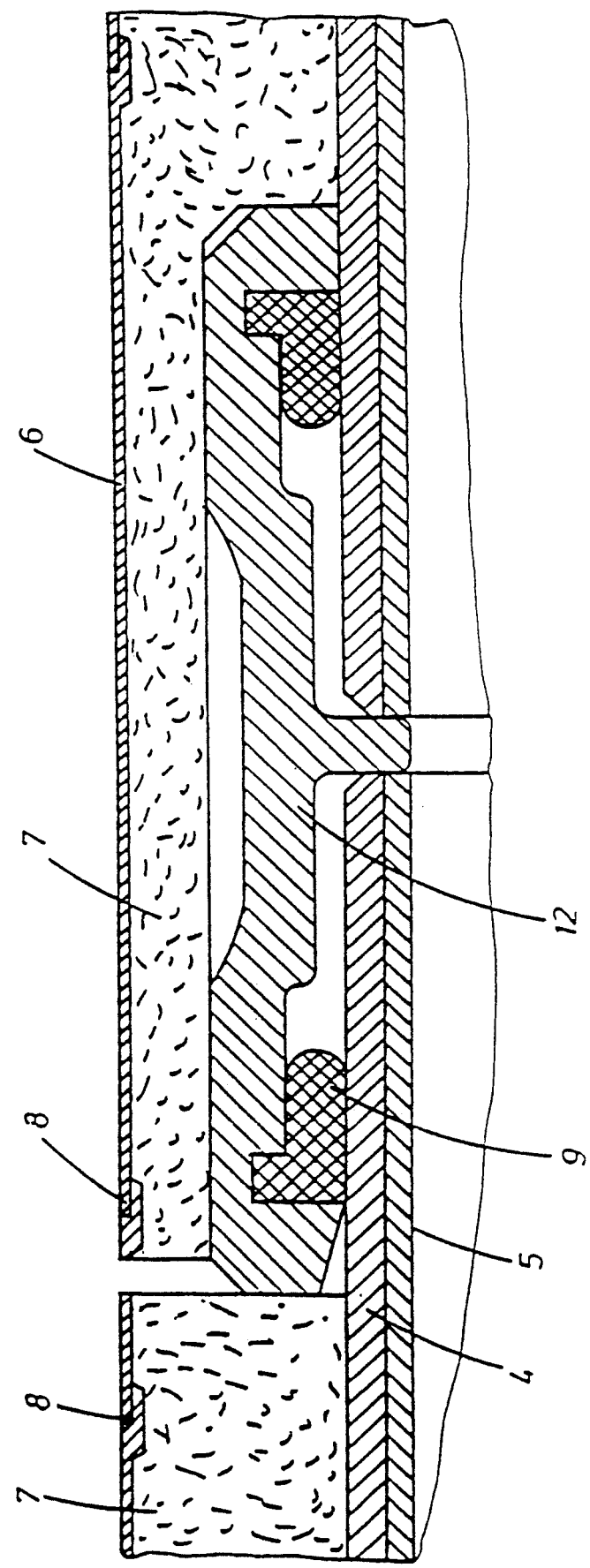
FIG. 4 is a fragmentary, longitudinal sectional view of a fourth embodiment of the invention.

The embodiment of FIG. 4 is characterized in that T-shaped ring 12 is designed so as to simultaneously take up the two seal rings 8 and 9 with the corresponding recesses, so that the seal rings and T-shaped ring 12 can be mounted as a unit when connecting the two pipes. The material used for the T-shaped ring and seal rings 8 and 9 is Tyton.

I claim:

1. A pipe joint for driving pipes laid underground by the driving technique and having an inner pipe to which the force of pressure is applied during driving, comprising:
   at least one pair of adjacent driving pipes, each said driving pipe constructed from an inner pipe having a generally uniform diameter along its length and a coaxially disposed outer casing, said outer casing having a greater diameter than said inner pipe and being disposed to form an annular space for an intermediate layer of cement mortar-like material between said inner pipe and said outer casing;
   said inner pipe of at least one of said adjacent driving pipes having a protruding end protruding beyond said intermediate layer;
   said inner pipe of a second of said driving pipes having a recessed end recessed within at least one of said intermediate layer and said outer casing, defining a protruding portion of said second driving pipe, said protruding end and said recessed end being positioned in abutting alignment with each other;
   the joint having at least one seal ring circumscribing said protruding end of said inner pipe of said one driving pipe and being overlapped by said protruding portion of said second driving pipe.

2. The pipe joint of claim 1, further comprising a distance ring disposed between said pair of adjacent driving pipes and interposed between said inner pipe and said outer casing of each of said pair of adjacent driving pipes.

3. The pipe joint of claim 2, further comprising two seal rings, one circumscribing an inner pipe end portion of each of said adjacent driving pipes, said distance ring engaging both seal rings.

4. The pipe joint of claim 2 wherein said distance ring is covered by at least one of said outer casing and intermediate layer of at least one of said driving pipes.

5. The pipe joint of claim 4, wherein at least one of said outer casings is made of at least one of sheet metal, asbestos cement and plastics, and which comprises a folded spiral-seam pipe having overlapping seams disposed on the inside of said outer casing and which form reinforcing ribs for said intermediate layer.

6. A pipe joint for driving pipes laid underground by the driving technique and having an inner pipe to which a pressure force is applied during driving, comprising:
   at least two adjacent driving pipes, each said driving pipe having an inner pipe, a coaxially disposed outer casing with a diameter greater than the inner pipe diameter so that a space is defined between said inner pipe and said outer casing, and an intermediate layer of cement mortar-like material interposed between said inner pipe and said outer casing;
   said inner pipe of one of said driving pipes having a protruding end protruding beyond said intermediate layer;
   the joint having at least one seal ring circumscribing said protruding end and being overlapped by a protruding portion of said adjacent driving pipe;
   a distance ring disposed between said adjacent driving pipes;
   said inner pipes of said adjacent driving pipes being disposed flush with each other and defining a gap therebetween; and
   a float mounted ring float mounted proximate the gap at the joint between said inner pipes, said float mounted ring having a protruding tongue engaging the ends of said inner pipes at said gap and said ring being made of a softer material than said inner pipes.

7. The pipe joint of claim 6, wherein said ring has a T-shaped cross section, said tongue being formed by the stem of said T-shaped cross section and the two arms of the T-shaped cross section overlapping the end portions of the corresponding inner pipes.

8. The pipe joint of claim 6 wherein said ring is made of at least one of soft iron, copper and aluminum.

9. The pipe joint of claim 6, wherein said ring is adapted to engage said seal rings.

10. The pipe joint of claim 2 wherein said driving pipes are ready-to-lay units comprising the inner pipe, outer casing and intermediate layer.

11. The pipe joint of claim 10, wherein said distance ring is included in said ready-to-lay unit at least at one end of the driving pipe.

12. The pipe joint of claim 6, wherein the protruding end portions of said inner pipes, casings and intermediate layer define a chamber between the driving pipes to be connected, said chamber adapted for taking up said seal ring, said distance ring and said float mounted ring.

13. The pipe joint of claim 2, wherein said pipe joint has a seal ring circumscribing a protruding end portion of at least one of said inner pipes and wherein said distance ring lies against said seal ring and is anchored with respect to said intermediate layer of one of said driving pipes.

14. The pipe joint of claim 11. wherein a seal ring is included in said ready-to-lay unit at one end of the driving pipe.

15. The pipe joint of claim 3 wherein said distance ring is covered by at least one of said outer casing and intermediate layer of at least one of said driving pipes.

16. The pipe joint of claim 1 wherein said driving pipes are ready-to-lay units comprising the inner pipe. outer casing and intermediate layer.

17. The pipe joint of claim 10. wherein a seal ring is included in said ready-to-lay unit at least at one end of the driving pipe.

* * * * *

UNITED STATES PATENT AND TRADEMARK OFFICE
CERTIFICATE OF CORRECTION

PATENT NO. : 5,165.822
DATED : November 24, 1992
INVENTOR(S) : Hans-Georg Hein

It is certified that error appears in the above-indentified patent and that said Letters Patent is hereby corrected as shown below:

Column 1, Line 49
"distance" should be --distances--

Column 3, Lines 56-59
[drawing, in which Figs. 1 to 4 show various exemplary embodiments of the pipe joint in cross section and a schematic view] should be deleted Signed and Sealed this Thirtieth Day of August, 1994

Attest:

BRUCE LEHMAN

*Attesting Officer*     *Commissioner of Patents and Trademarks*